June 11, 1968  G. E. JARLAN  3,387,458
SEAWALL STRUCTURES
Filed March 10, 1965  2 Sheets-Sheet 1
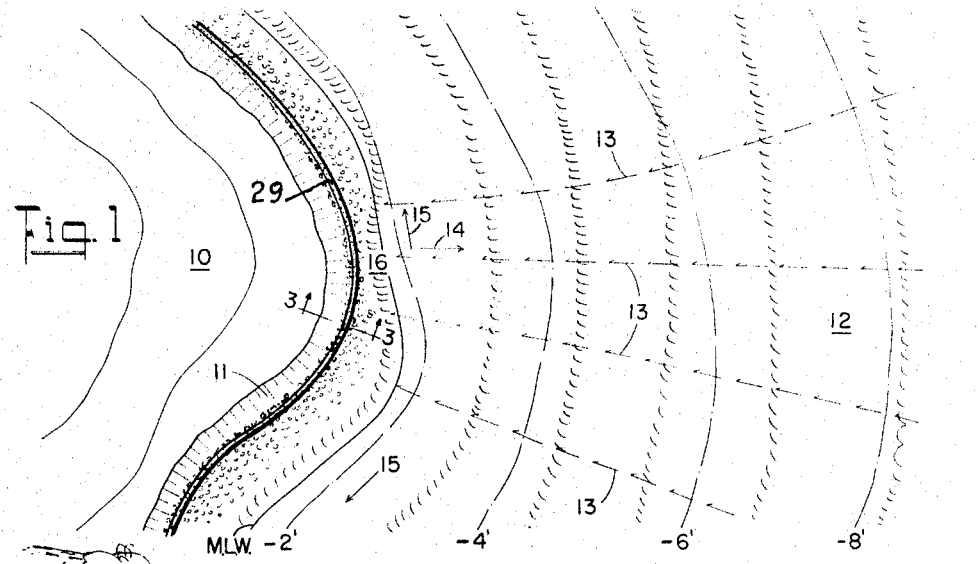
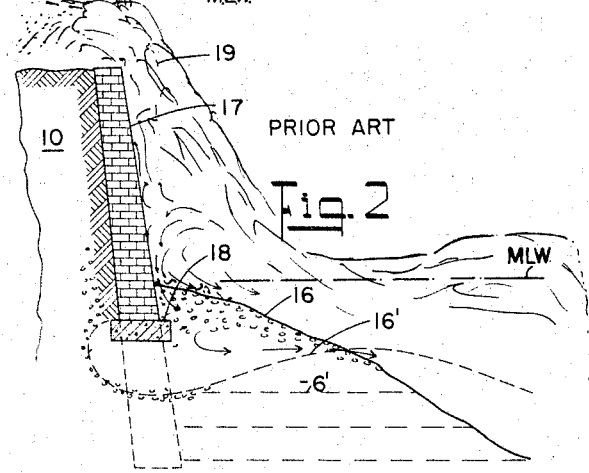
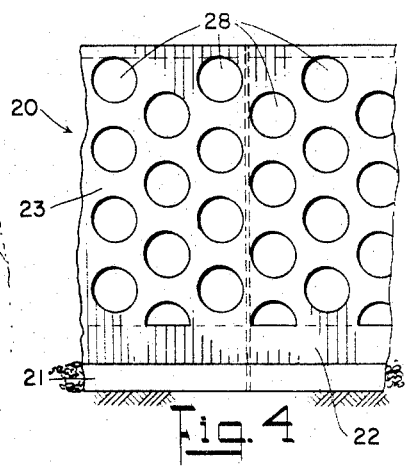
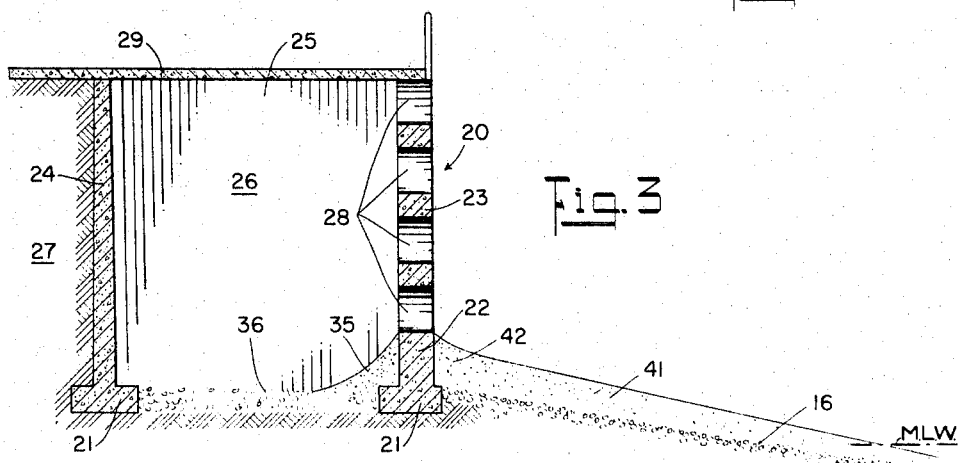
INVENTOR:
GERARD EUGENE JARLAN June 11, 1968 — G. E. JARLAN — 3,387,458
SEAWALL STRUCTURES
Filed March 10, 1965 — 2 Sheets-Sheet 2

INVENTOR:
GERARD EUGENE
JARLAN
per: R. Filipkowski
patent agent

United States Patent Office 3,387,458
Patented June 11, 1968

3,387,458
SEAWALL STRUCTURES
Gerard Eugene Jarlan, Ottawa, Ontario, Canada, assignor to Canadian Patents and Development Limited, Ottawa, Ontario, Canada, a corporation of Canada
Filed Mar. 10, 1965, Ser. No. 438,705
9 Claims. (Cl. 61—3)

ABSTRACT OF THE DISCLOSURE

A wave-absorbing seawall for controlling bottom-eroding currents tending to remove fine material from a strand when under attack by waves, comprising a landward wall and a frontal wall which is extensively apertured by a multiplicity of horizontal ducts above a substantially imperforate base portion of low height, the ducts having transverse dimensions from about 12 to 24 inches or larger, the frontal wall being spaced up to 20 feet from the landward wall to define an open surge chamber, and the action at high water being to fill the chamber freely through the ducts as a wave rises and then to cause jets of water to stream outward as the sea recedes so as to develop brisk seaward flow of surface layers in shallow water inducing underneath this flow a reverse make-up current which moves up the slope carrying entrained particles; the latter current is periodic.

---

This invention concerns maritime civil engineering works, and more particularly relates to masonry or concrete structures erected between a beach and a headland for conserving the beach sand covering which otherwise would be stripped from the strand at high water under strong wave action.

It is the primary object of this invention to provide a maritime structure for protecting a land mass subject to wave attack, by controlling bottom currents adjacent the structure.

It is a concomitant object of this invention to provide a perforated seawall having a solid basal portion embedded in the strand, for preventing significant reflection of waves and thereby minimizing underpressures likely to cause erosion at the base.

It is also an object of the invention to site a maritime structure having a perforated seaward-facing wall between the high and the low water shorelines, whereby the action of impinging waves will deposit sand beach materials adjacent the base of the wall and seawardly therefrom.

Essentially the invention consists in a protective seawall structure sited between a headland or promontory and the low water shoreline, having a seaward facing vertical wall resting upon the beach and spaced from a solid landward wall coextensive horizontally and vertically with the seaward wall and rising above the highest water level, the seaward-facing wall being extensively perforated by horizontal transverse ducts uniformly spaced over its upper elevational surface area, the lowermost openings of which are at a height above the original beach corresponding to the height to which the build-up of the restored beach is desired.

In my United Stated Patent No. 3,118,282 there are described structures intended for deep water sites, namely installations designed to be located in sea depths down to about 200 feet, for dissipating the energy of deep water waves; such structures are characterized by a seaward-facing wall extensively apertured over its entire elevational area and by a spaced substantially unapertured solid landward wall defining a surge chamber between them. The present invention, while also being embodied as a pair of spaced-apart walls having a surge chamber between them, differs from the former in several important respects, chiefly in that it is located adjacent the land mass to be protected and is designed to control bottom currents to prevent erosion thereby of the beach or sea-floor material which lies adjacent the land mass to be protected; and also in that its seaward-facing wall is unapertured below a level which is significantly higher than the existing beach on which it is erected. The present invention provides structures primarily intended for the control of wave energy of impinging wave trains when partly submerged at high water conditions, and for the control of bottom currents generated by the wave perturbation so as to build up sand deposits on the beach rather than to erode away existing beach materials, thereby to shape the beach deposits as a smooth surface sloping up to the top of the solid basal portion of the seaward-facing wall.

It is known that the character of the sea bottom adjacent a beach may focus waves propagating landward, concentrating their energy on promontories, capes, and headlands when the contours of the sea bottom are curved about centers in such land masses. Heretofore, attempts to protect such headlands by the erection of masonry walls rising from deep foundations in the beach have failed to provide long term protection, since under high water conditions the run-up of the breaking waves results in greatly aggravated erosion of the bottom at the foot of the wall. Solid walls reflect incident waves, producing high hydraulic pressures on the entire wall area and generating strong currents that scour the beach and undermine the structure. Solid seawalls may be destroyed completely in a single violet storm. Any solid seawall designed to withstand repeated assaults by waves would have to extend a very considerable distance below ground in order that currents developed by wave doubling on reflection could not excavate beneath the structure. Such solid wall breakwaters would be exorbitant in cost and would always have the disadvantage of inciting clapotis in the sea at high water, and would moreover form an unsatisfactory beach from which all fine sands were removed.

The strand between a typical headland jutting into the sea and the low water line tends over a period of geologic time to become largely a residue of shingle and stone pulled down from a resistant cliff or escarpment, against which waves break at high water, producing eroding under-pressures and bottom currents that remove the finer particles. Structures according to the present invention erected in front of such escarpment substantially arrest and even reverse the erosive processes. These structures function not only to harmlessly and efficiently dissipate wave energy and to reduce wave reflection considerably, but also generate a net relatively quiet current flow in the sea water along the bottom adjacent the seawall at high water and wave conditions, which carries suspended sand particles landward up the beach slope to an ultimate height set by the level of the barrier wall portion of the seawall.

Structures erected according to the present invention permit precisely determining in advance, the ultimate height and extent of restored beach materials, by choosing the height of the basal barrier wall portion above the existing strand within a range of from less than one foot to as much as five, six, or more feet. A suitably designed and located seawall may be expected to restore material from the seabed, to transport it to the strand zone lying between the seawall and low water line, and so to build up and conserve a stable beach covering. Depending on the extent of tide, maximum wave heights encountered, and the frequency of storms, as well as on the availability of beach material in the vicinity of the strand, a highly desirable beach composed of finer sand particles may be built up under the action of a single storm. The surface of the restored beach may be expected to remain in equilibrium, as considered on a long-term basis, between the normal eroding agencies such as rain and wind, and the beach restoring processes pertaining each time waves run against the sea wall under high water conditions.

The beach stabilizing or conserving structure according to the invention also serves to effectively diminish alongshore currents associated with the breaking of waves focussed on a headland or cape by reason of wave refraction.

Where suitable sand materials do not exist on the seabed within the offshore region over which wave disturbance is capable of entraining and suspending sand, adequate beaches may be artificially produced by dumping sand on the strand area to be covered, and wave action eventually will spread out and conserve the material as a substantially stable layer. The deposit will need to be replenished only as necessary to supply material lost by attrition as silt or as wind-blown dust.

In carrying the invention into effect, particularly for the protection of a promontory or headland subject to strong erosion by the sea and formed of unconsolidated materials such as marl or shale, a horizontally extended frontal wall of a seawall structure is erected either as an integrally cast concrete body or by cementing together assembled prefabricated slabs upon shallow footings set in the existing beach at a distance above low-water level such that the footings will be covered upon eventual build-up of the restored beach but within the strand zone, and at a position where the depth of water will be several feet at normal high water conditions. The frontal wall is erected solid, that is, imperforate, above the footing to a height which is less than the mean high water level and generally not exceeding about five or six feet above the existing beach, the remainder of the wall being erected as a perforate screen wall which rises several feet higher than the highest reach of any wave. A substantially impervious landward wall is erected behind the frontal wall in any maner and of any suitable material, being spaced behind the frontal wall by, for example, from about 12 to about 20 feet, and being built coextensive in height and horizontal extent with the frontal wall, to which it is braced by transverse vertical walls at intervals along the length of the structure. The seawall structure may be hundreds or thousands of feet in horizontal extent, as may be necessitated in order to protect a cape or promontory. A cover or deck may be provided to aid in bracing the upper margin of the frontal wall, and to serve as a promenade, footpath, or road.

The invention is described in greater particularity in and by the accompanying figures of drawing appended hereto and forming part of this specification, wherein:

FIGURE 1 is a plan view of a headland, promontory or cape showing wave-refracting bottom contours and wave-focussing action, and the siting of a protective seawall according to the invention to conserve the beach materials;

FIGURE 2 is a vertical elevation in section showing a prior art solid masonry seawall as sited similarly on the strand of FIGURE 1, to show the engulfing action of breaking waves and the eroding currents produced thereby;

FIGURE 3 shows a beach-conserving structure according to the invention in transverse vertical section taken on line 3—3 of FIGURE 1, illustrated at low tide and showing a fully restored beach;

FIGURE 4 shows a frontal elevation of the frontal wall of the structures of FIGURES 1 and 3, illustrating ducting;

Figure 5:
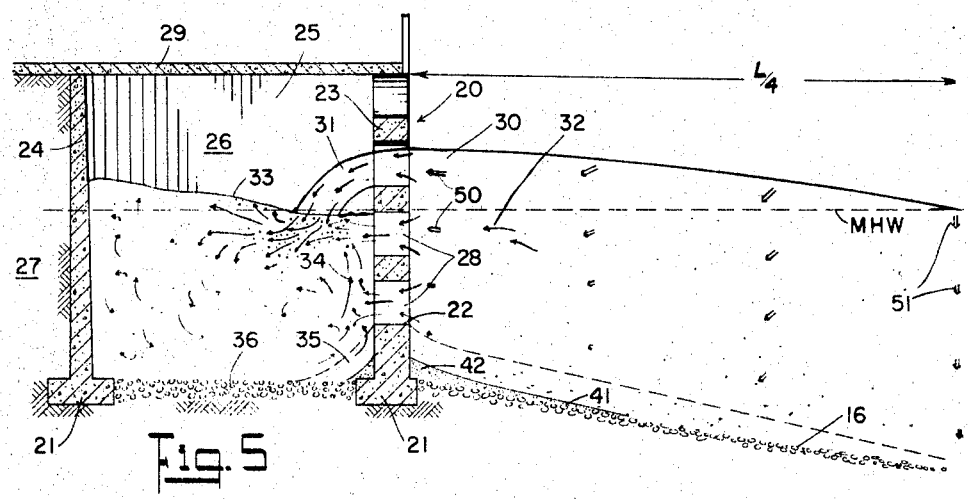
FIGURE 5 shows the structure of FIGURE 3 under high water condition as the crest of a wave enters the frontal wall.

Referring to the drawings, a headland 10 is shown in FIGURE 1 and other drawings, being subject to wave focussing as waves in the sea propagate landward over the seabed, whose contours are marked in feet below means low water level and are curved about centers in the land mass. The escarpment 11 is a geologic relic that is periodically attacked at high water conditions whenever energetic waves advance along convergent tracks 13 to break against the bluff or bank, producing vigorous currents having a strong seaward component 14 and a component 15 at right angles thereto, tending to scour the beach area 16 adjacent the escarpment. The strand zone is shown littered with a detritus of boulders, shingle and pebbles loosened from the headland 10.

Any large scale construction sited near the ocean on such headland, such as a building, road, or earthwork, is in hazard of destruction if the bluff 11 is unconsolidated or backed by relatively unresistant clay, marl, or shales. As may be understood from FIGURE 2, prior art attempts to shield the headland by setting up a massive solid masonry wall 17, will eventually fail because of undercutting of the wall base 18. At high water, energetic waves striking the solid wall are reflected, with consequent doubling of amplitude and production of leaping crests 19 that spill over the wall. At such times the wall is subjected to enormous peak hydraulic pressures, and the beach 16 at the foot of the wall is scoured by intense currents, which rapidly undermine and destroy the wall. In time, even a deeply-placed wall would be undercut as the material forming the beach is periodically eroded.

A preferred beach-conserving protective seawall according to the present invention shown in FIGURES 3 to 7, comprises the frontal wall 20 having a footing 21, a lesser imperforate lower barrier wall portion 22 standing upon the footing, and a greater perforated screen wall portion 23 surmounting the basal portion. The structure is sited upon the strand between the low and the high mean water shorelines (hereinafter designated M.L.W. and M.H.W.), and is preferably erected at a beach level intermediate extreme low and high water lines. The height of the frontal wall should be somewhat higher than the seas produced by any combination of tide and waves.

A landward wall 24 is spaced behind and parallel with the seaward-facing wall 20 to define the chamber 25 between them, which may have a breadth between walls 23 and 24 of the order of from ten to twenty feet, depending on the character of the sea bottom, the depth of water offshore, and wave characteristics in that coastal area. Transverse vertical walls 26 extend across the chamber to brace the seawall, being spaced horizontally, for example at intervals of twenty feet. The structure is preferably backfilled with material 27 which may be strand material.

The screen wall 23 is extensively apertured by a plurality of openings 28, constituted as short transverse cylindrical ducts having parallel horizontal axes spaced uniformly apart over the entire area of portion 23. The duct spacings and cross-sectional shapes each may be varied considerably. For example, the ducts may be cylinders ranging from about twelve inches to about twenty-four inches diameter or larger, or they may have oval, elongate oval, or even quasi-rectangular cross-sections. The center-to-center spacing of adjacent circular duct openings may range from about twenty-four to about thirty-six inches or more. It is important that regardless of the duct cross-sectional form, the ratio of total duct cross-sectional area to the elevational area of the screen wall 23 should preferably lie between about 0.45 to about 0.75 and preferably between about 0.55 to 0.65. When the screen wall has about 60% of its frontal area constituted by duct cross section area, a low reflection coefficient for the usual short period waves encountered is achieved.

The height of the imperforate barrier wall portion 22 may, for example, be from about a foot to as much as six feet above the existing beach, as measured up to the lower margins of the lowest openings 28. The height of the barrier wall portion will be chosen in accordance with several factors at each particular location, the chief consideration being that one or more of the lower tiers of ducts should be submerged at mean high water. As will be explained hereinafter, the action of the seawall will be to raise the beach at its highest point to about the level of the lower margins of the lowest duct openings, so that on a coastline where the tide is about eight feet the portion 22 may rise nearly six feet above M.L.W. On the other hand if the prevailing tide is only two feet the barrier wall will be quite low. It is to be understood that the term "tide" as used herein is intended to include in addition to the attraction of planetary body masses, any rise of high water level due to barometric low pressure and on-shore winds.

The vertical height of the top of the composite frontal wall 20 will be determined by the highest reach of sea water for any combination of tides, waves, and winds, so that the uppermost tier of ducts will be submerged only infrequently. A deck 29 covering chamber 25 will be erected generally about three or four feet above the highest seas. It should be noted that at a location where the M.H.W. depth is ten feet, large amplitude waves cannot propagate to the seawall, so that typical crest-to-trough wave heights for incident trains will be under four feet, and less for reduced water depths.

Referring now to FIGURE 5, under M.H.W. conditions the sea level lies intermediate the vertical extent of the screen wall portion 23. At the time when the crest 30 of a wave is at the frontal wall, the sea spills into the chamber 25 as a multiplicity of jets 31 flowing through those ducts 28 which are submerged. The orbital motion of water particles undergoing wave motion is horizontal at the wave crest, as shown by arrows 50 directed into the frontal wall, with a tangential velocity in the upper layers of the sea greater than the velocity of corresponding particles below. Such added velocity is superimposed on the flow entering the upper wetted ducts.

Because the inflowing upper layers of water have slightly greater horizontal velocity than the layers 32 immediately underlying them, the latter tend to be drawn along by reason of the internal friction of seawater, toward the seawall. This effect decreases markedly with depth so that when the crest 30 is at least a few feet above the barrier wall portion 22, substantially no induced currents are developed on bottom 16.

The water jets flowing into the chamber vigorously disturb the chamber contents, creating a substantial displacement of the layers near the surface 33 in a direction away from the front wall. An induced ascending flow 34 is produced along the inside of the wall, which mingles with the upper streams as these partake in the varying and random turbulence spreading throughout the chamber. Any particles of sand entrained in jets 31 therefore tend to remain suspended in the chamber, except that a fillet space 35 in the lee of the barrier wall at the bottom will receive deposits from water drifting horizontally and rising adjacent the wall portion 22. Once the fillet has been shaped to a predetermined profile, equilibrium is maintained so that the amount of sand carried out of the chamber is balanced by the quantity which enters it. The chamber bottom 36 does not build up any substantial deposit nor is it subjected to currents strong enough to undermine the footings of either the frontal or landward walls. The chamber consequently does not require a closing bottom other than the pre-existing strand or a loose deposit of gravel or stone.

At a later time when the crest of the wave has passed into the wall and the water level in the sea has fallen slightly below the chamber level 33, the motions of particles participating in wave action will have become directed downward and later also outward. This condition pertains when the wave has propagated about a quater of a wavelength beyond the crest, at which time the orbital motions at the frontal wall will be as shown by arrows 51. The chamber begins to empty as the wave recedes. Outflowing jets 31' sweep the surface layers of the sea outward. An induced current 37 moves seaward below the jetted flow, linking with the outward component of particle orbital motion adjacent the barrier wall, and thereby promoting the ascending flow 38. Consequently a landward motion 39 of deeper layers arises to satisfy the aforesaid circulation.

Figure 6:
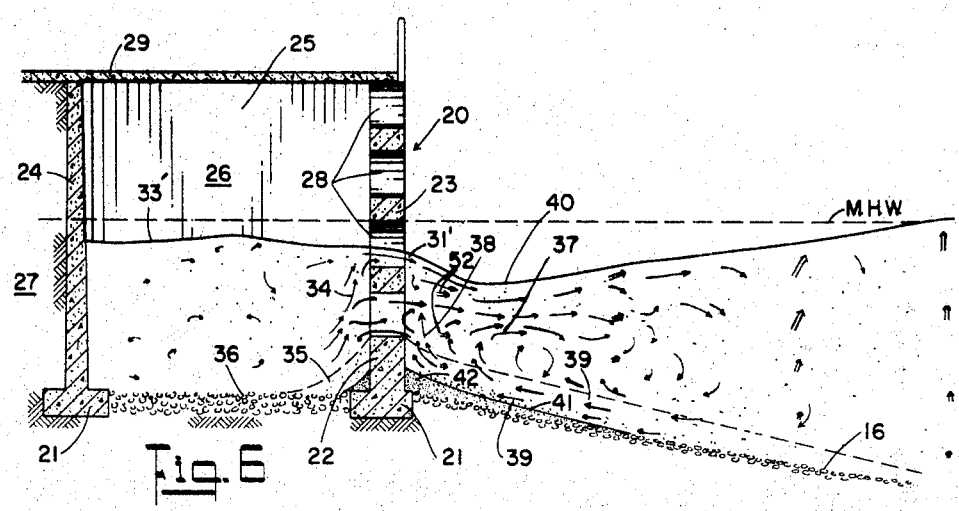
FIGURE 6 illustrates the structure of FIGURE 3 under high tide condition with the wave trough at the frontal wall; and, FIGURE 7 shows the seawall at an intermediate water level as the wave trough approaches the frontal wall.

By the time that the wave trough 40 has arrived at the frontal wall as shown in FIGURE 6, the water level 33' in the chamber substantially exceeds the height of the sea because of the phase lag inherent between the chamber water level and the wave. The freely outflowing jets 31' spill at their maximum velocity into the wave trough, while those ducts which are submerged discharge horizontal streams below the surface. At this time the particle orbital motion as shown by arrows 52 is horizontally away from the frontal wall. The seaward displacement of the surface layers due to the jets, both freely spilling and submerged, induces a brisk seaward flow of the adjacent underlying layers, but because the phenomenon takes place in much shallower water below the top of the barrier wall portion 22, the complementary landward current 39 is stronger as well as nearer to the beach 16. The ascending current 38 streaming closely along the outside of the barrier wall portion is more pronounced. The ground drift current 39 carries suspended particles, but has a velocity sufficiently low that the bottom is not scoured and heavier entrained solids are able to sink out and be spread as an upwardly sloping deposit 41.

As the wave advances further and the wave level exceeds the chamber level, the ground drift is no longer sustained, but some landward motion may persist for a part of the wave interval when the sea is rising, through its momentum. The current 39 is not actively propelled again until a horizontal seaward surface stream is again generated by the outflowing jets as described. It will therefore be apparent that the ground drift is a unidirectional irregular current lasting somewhat less than half the period of a wave. Particles carried by it near the seabed undergo lurching motion, affording time to settle to the bottom. Those particles moving in the upper portion of the current 39 may either be captured by the outward stream 37 and carried seaward, or may enter the chamber over the barrier wall.

While the foregoing action has been described for a pure single-period wave train to simplify the presentation, it has been found that the generation of an intermittent unidirectional ground drift current is not less effective for wave trains of mixed periods. The beach-conserving current is induced also for a relatively wide range of barrier wall heights, and for various slope angles of the produced deposits. The greatest height of the barrier wall at a given site will be chosen so that at any mean sea level no wave propagating toward the frontal wall will be substantially reflected from it so as to produce undermining bottom currents.

At the initial occurrence of wave action at high water following erection of the structure, a relatively copious deposition will occur before the barrier wall portion in the fillet space 42. Eventually as the deposit enlarges in height and breadth a lesser rate of deposition will prevail, until the uppermost margin of the deposit reaches a level just under the lower margins of the lowermost duct openings 28, or as shown in FIGURE 3.

Figure 7:
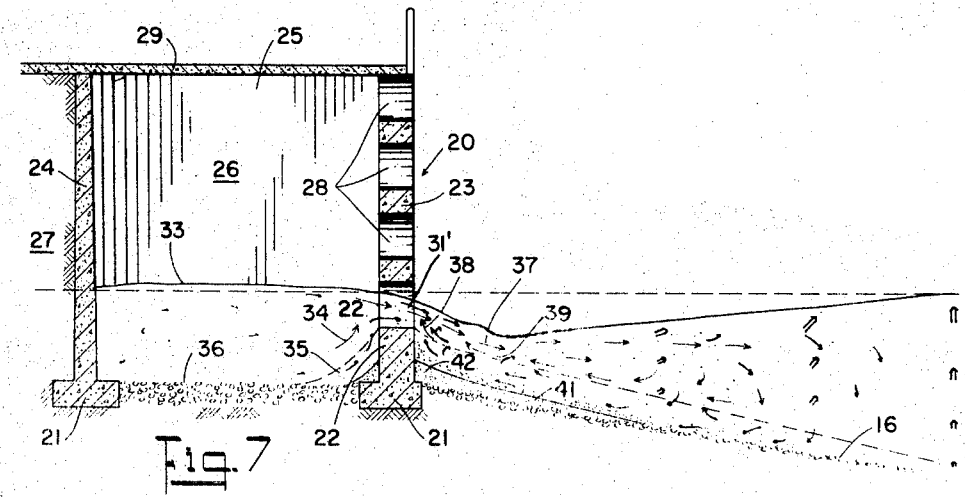

At an intermediate water level such that the top of the barrier portion is just submerged, substantial beach-building currents 39 will exist during those intervals when the jets are spilling seawards, as shown in FIGURE 7. Because the depth of water over the strand area 16 is relatively shallow, there is a corresponding lesser wave height so that the amount of water jetted is reduced in proportion.

At water levels and wave heights such that only the wave crests can penetrate into the chamber, the wave will be a breaking wave, and hence will comprise the well known spill-flow effective mainly to carry material landward as smooth beds. The outflowing water streaming from the lowermost duct openings at such times will be intermittent and relatively weak so that the beach material will not be significantly removed thereby.

Although the foregoing description has particularly referred to the protection of land areas jutting out into the sea, the invention is equally useful for protection of land masses bounded by relatively straight shorelines. The undercutting of cliffs of limestone, chalk, or shale may be substantially arrested by siting a protective structure as described on the strand or in the shallow sea at the foot of such cliffs, clear of any overhanging parts thereof. In such case the structure will not necessarily be wholly out of the water at low tide, but it would serve to build up an underwater deposit in front of the sea wall.

I claim:

1. A maritime structure for protecting a land mass having a strand subject to wave attack, by controlling erosion of material by bottom currents, comprising an upright frontal wall sited on the strand or seabed below the high water shoreline and subject to wave attack, said frontal wall being horizontally extensive and having a vertical height at least as high as maximum wave height, and comprising a lower imperforate base portion resting in the strand or sea bed and extending to a height of about one foot and not greater than about six feet above the strand or sea bed, and also comprising a perforated screen wall portion surmounting said base portion and having a multiplicity of transverse openings spaced over its entire elevational area, said openings comprising horizontal ducts whose cross-sectional area comprises from 0.4 to 0.75 times the said elevational area, and a landward substantially impervious upright wall located adjacent the land mass to be protected and spaced from said frontal wall by from 10 to 24 feet to define with said frontal wall an open surge chamber, and means bracing said walls together, whereby wave action incident on said structure will be effective to deposit material in front of said imperforate base portion.

2. A maritime structure as claimed in claim 1, wherein the structure is sited on the strand between the low and high mean water shorelines so as to be wholly out of the water at low mean water level.

3. A maritime structure as claimed in claim 2, wherein the floor of the surge chamber comprises the original strand.

4. A maritime structure as claimed in claim 3, wherein the frontal and landward walls are connected by transverse walls extending the full height of said walls.

5. A maritime structure as claimed in claim 4, wherein the surge chamber is closed at the top by a deck adapted to serve as a promenade, footpath or road.

6. A maritime structure as claimed in claim 1 in which the openings in the frontal wall are cylindrical ducts of from twelve to about twenty-four inches diameter.

7. A maritime structure as claimed in claim 6 wherein the center-to-center spacing of the openings in the frontal wall is from twenty-four to thirty-six inches.

8. A maritime structure as claimed in claim 1 in which the openings in the frontal wall are of non-circular cross-section.

9. A maritime structure as claimed in claim 1 in which the landward wall is backed with supporting material.

References Cited

UNITED STATES PATENTS

| 2,384,207 | 9/1945 | Stoye | 61—3 |
| 2,474,786 | 6/1949 | Humphrey | 61—4 |
| 2,539,850 | 1/1951 | Marry | 61—49 |
| 3,118,282 | 1/1964 | Jarlan | 61—4 |

FOREIGN PATENTS

| 407,575 | 1/1910 | France. |
| 1,095,527 | 12/1954 | France. |
| 1,326,578 | 4/1963 | France. |
| 915,057 | 1/1963 | Great Britain. |
| 2,868 | 1855 | Great Britain. |

EARL J. WITMER, *Primary Examiner.*